United States Patent Office 2,729,667
Patented Jan. 3, 1956

2,729,667

PREPARATION OF UNSYMMETRICAL DIALKYL BIS(DIALKYLAMIDO)PYROPHOSPHATES

George A. Saul, Nitro, W. Va., assignor to Monsanto Chemical Company, St. Louis, Mo., a corporation of Delaware No Drawing. Application November 14, 1951, Serial No. 256,365

5 Claims. (Cl. 260—461)

The present invention relates to a process for preparing unsymmetrical dialkyl bis(dialkylamido)pyrophosphates.

It is an object of the present invention to provide a process for preparing pyrophosphates useful as insecticides, plasticizers and for other purposes. A further object is to provide a process for making unsymmetrical dialkyl bis(dialkylamido)pyrophosphates in good yield. A still further object is to provide an economical efficient process for making these compounds. Other and further objects will be in part particularly pointed out and in part obvious from the description following.

The general formula of the products produced by this invention is

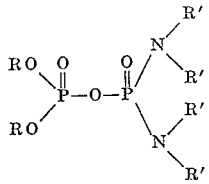

where R and R' are alkyl groups as for example methyl, ethyl, propyl, butyl and amyl radicals. It has been found that products of this type may be efficiently prepared by the reaction of an alkyl halophosphate and an alkyl bis(dialkylamido)phosphate. The general reaction may be represented by the equation

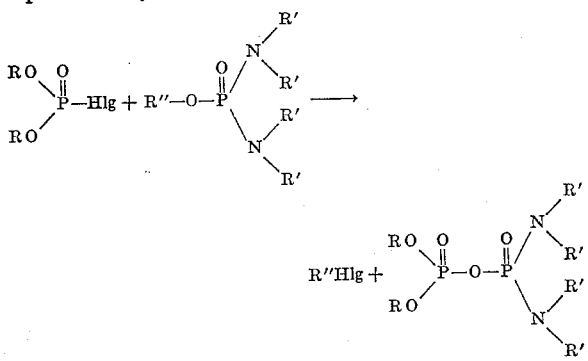

where R"Hlg represents by-product alkyl halide and R and R' have the same significance as before, R" representing a short chain alkyl group as for example methyl, ethyl and propyl radicals. The halogen may be chlorine, bromine or iodine but the chlorides are preferred for reasons of economy.

Attempts to condense triethyl phosphate with bis(dialkylamido)phosphoryl chloride were fruitless. Similarly attempted condensation of diethyl phosphoric acid with the aforesaid halide in the presence of pyridine was unsuccessful. On the other hand diethyl chlorophosphate reacts readily with short chain alkyl esters of bis(dialkylamido)phosphoric acid to produce the desired pyrophosphate in good yield. Side reactions are negligible although there existed the possibility that ethyl chlorophosphate would react with itself, splitting out ethyl chloride.

The condensation of alkyl chlorophosphates with phosphate esters usually requires rather severe reacting conditions. For example condensation of diethyl chlorophosphate with triethyl phosphate by heating at 150° C. in the presence of a copper bronze catalyst is described by Hall and Jacobson, Industrial & Engineering Chemistry, vol. 40, page 694 (1948). Under these conditions tetraethyl pyrophosphate is formed together with by-product ethyl chloride. However, diethyl chlorophosphate condenses at relatively low temperatures with esters of bis(dialkylamido)phosphoric acids in the absence of a catalyst. Mild heating is desirable for efficient reaction. Once the reaction is initiated, an exothermic reaction sets in which may be carried substantially to completion by continuing the heating after the vigorous exothermic reaction subsides. Solvent is unnecessary although one may be employed if desired, toluene and xylene being suitable.

The following are specific examples illustrating the invention.

Example 1

Into a glass or glass-lined reactor fitted with a stirrer, thermometer and reflux condenser there was charged 94.6 parts by weight of diethyl chlorophosphate and 100 parts by weight of ethyl bis(dimethylamido)phosphate. The reaction was stirred and heated to about 80° C. at which point an exothermic reaction set in and ethyl chloride was evolved. Heating was continued at 80–90° C. for about half an hour after which time 24.9 parts by weight of ethyl chloride had been evolved. While continuing heating at 80° C. a vacuum line was connected to the top of the condenser for about 45 minutes after which a total evolution of 34.2 parts by weight ethyl chloride was measured. The residue consisting in the crude technical product was a clear liquid, specific gravity 1.16 @ 25° C./20° C., $N_D^{25}$ 1.4395. The product may be further purified by distillation, if desired, to obtain a clear liquid, B. P. 145–150° C./1 mm. However, tests of the materials for insecticidal properties revealed that the crude technical product is fully equivalent to that obtained by distillation.

Example 2

Into a glass or glass-lined reactor of suitable capacity fitted with a condenser, stirrer and thermometer there was charged 179.1 parts by weight of ethyl bis(dimethylamido)phosphate and 172 parts by weight of diethyl chlorophosphate. Some heat was evolved, and cloudiness was observed immediately after mixing. The reaction mixture was then gradually heated, evolution of ethyl chloride being observed at 47.5° C. The reaction became rapid at 60° C. and the temperature rose rapidly so heating was discontinued. The exothermic reaction carried the temperature up to about 73° C., and after it dropped back to 70° C., heating was continued for about 50 minutes at 70–75° C. and a vacuum line attached to the top of the condenser to aid in removing ethyl chloride. Heating was continued for 1½ hours at 75° C. under vacuum and finally for about an hour under 2 mm. pressure. Analysis of the crude product showed that it contained only 0.48% chlorine. Nitrogen was 9.4% as compared to a calculated value of 9.7%.

Substitution of 165 parts by weight methyl bis(dimethylamido)phosphate for the ethyl ester in the foregoing procedure resulted in an even more rapid reaction. Upon mixing the reactants at room temperature an exothermic reaction set in and methyl chloride was evolved. The temperature rose rapidly to 65–70° C. without the application of heat. Heating was then continued and by-product methyl chloride removed as described. Essentially a quantitative yield of crude unsymmetrical diethyl bis(dimethylamido)pyrophosphate formed.

Although the invention has been illustrated by reference to specific examples, it will be appreciated that it is not limited thereto.

What is claimed is:

1. The process of making an unsymmetrical dialkyl bis(dialkylamido)pyrophosphate which comprises reacting a dialkyl halophosphate and an alkyl bis(dialkylamido)phosphate.

2. The process of making an unsymmetrical dialkyl bis(dialkylamido)pyrophosphate which comprises heating together substantially equimolecular proportions of a dialkyl chlorophosphate and an alkyl ester of bis(dialkylamido)phosphoric acid.

3. The process of making an unsymmetrical dialkyl bis(dialkylamido)pyrophosphate which comprises heating together substantially equimolecular proportions of diethyl chlorophosphate and an alkyl ester of bis(dimethylamido)phosphoric acid.

4. The process of making an unsymmetrical dialkyl bis(dialkylamido)pyrophosphate which comprises heating together substantially equimolecular proportions of diethyl chlorophosphate and the ethyl ester of bis(dimethylamido)phosphoric acid.

5. The process of making an unsymmetrical dialkyl bis(dialkylamido)pyrophosphate which comprises heating together substantially equimolecular proportions of diethyl chlorophosphate and the methyl ester of bis(dimethylamido)phosphoric acid.

References Cited in the file of this patent

UNITED STATES PATENTS

| 2,336,302 | Schrader | Dec. 7, 1943 |
| 2,502,966 | Kosolapoff | Apr. 4, 1950 |

OTHER REFERENCES

B. I. O. S. Final Report 1808, page 17 (1947).
B. I. O. S. Report 714 PB#87923 R, page 25 (1948).